UNITED STATES PATENT OFFICE.

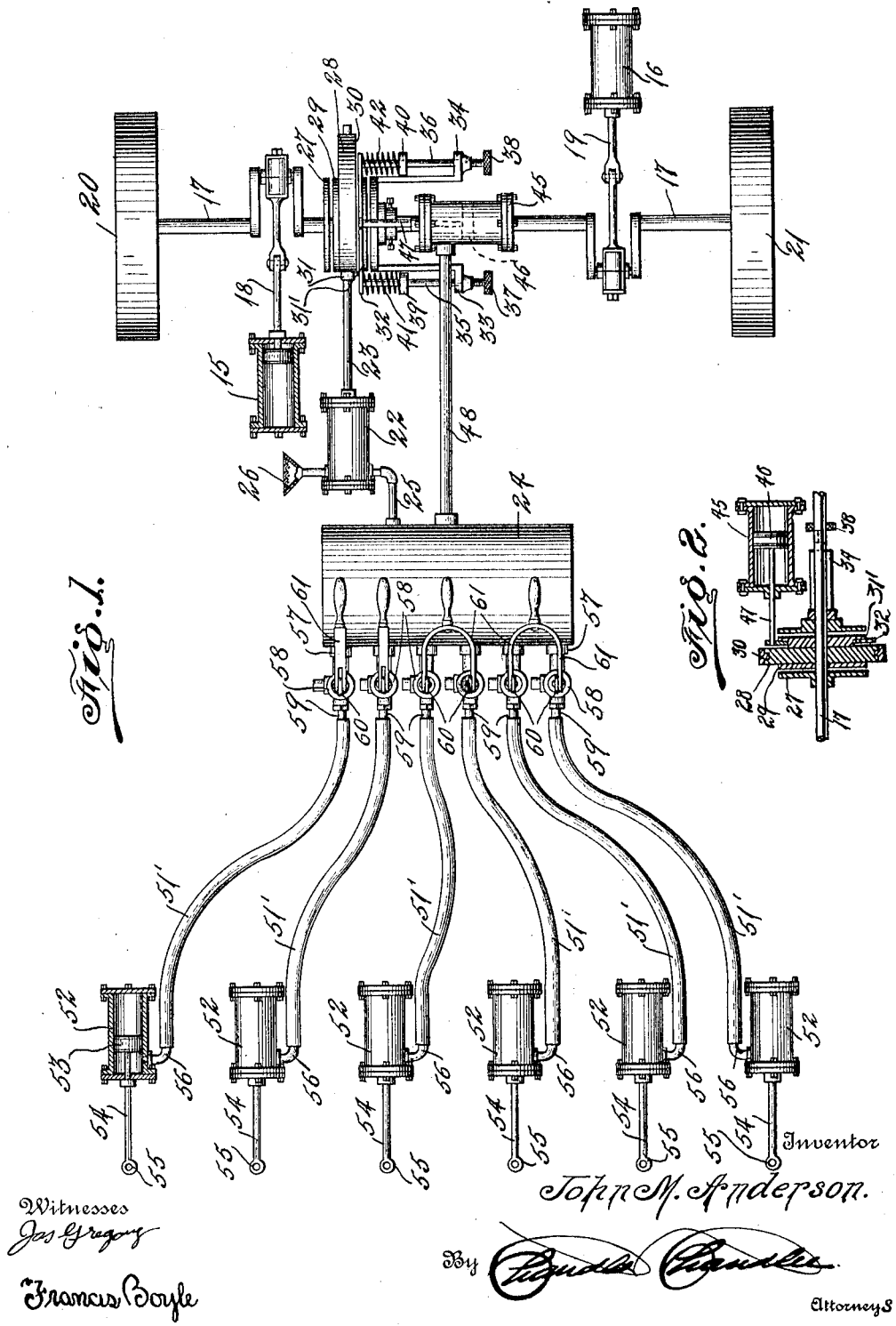

JOHN M. ANDERSON, OF FULLERTON, NORTH DAKOTA.

CLUTCH MECHANISM.

1,035,135.  Specification of Letters Patent.  Patented Aug. 13, 1912.

Application filed February 1, 1910. Serial No. 541,345.

*To all whom it may concern:*

Be it known that I, JOHN M. ANDERSON, a citizen of the United States, residing at Fullerton, in the county of Dickey, State of North Dakota, have invented certain new and useful Improvements in Clutch Mechanism; and I do hereby declare the following to be a full, clear, and exact description of the invention, such as will enable others skilled in the art to which it appertains to make and use the same.

This invention relates to a clutch mechanism designed more particularly to use in connection with traction plows or gang plows and has for its object the provision of a simple and efficient clutch mechanism by which a reservoir may be kept at constant pressure in order that the compressed fluids stored in the same will be utilized at any time and in any quantity to elevate the plows.

A still further object resides in the provision of an automatic clutch which will be simple in construction and efficient in operation.

With these and other objects in view the invention consists in a certain construction, combination and arrangement of parts and details as is hereinafter more fully described, specifically pointed out in the appended claims, and illustrated in the accompanying drawings which show a preferred embodiment of the invention.

Referring to these drawings which are attached to and form a part of this application, Figure 1 is a plan view in part section of the improved system shown applied to a plow elevating device. Fig. 2 is a detail view of the clutch mechanism enlarged.

Similar numerals of reference are employed to designate corresponding parts throughout.

The improved device is shown in connection with a gang plow, of which the traction frame is designated by the numeral 5. The engine and its connection with the driving wheels 6 of the frame have not been shown since it will be understood, from what will appear later, that the device to be presently described may be fitted to any form of traction engine usually employed in devices of this kind. The plow frame is designated in general by the numeral 7 and is shown to consist of a platform 8 supported by a pair of wheels 9 and 10. The forward end of the platform is pivotally connected with the rear end of the traction frame as shown at 11. Any improved form of connection may be employed between the two as will be readily understood. The plow beams are designated by the numeral 12 and their forward ends are pivoted to the plow frame in any preferred manner or as shown in the present instance brackets 13 may depend from the rear end portion of the platform for any suitable distance, these brackets having recesses which receive the forward extremities of the beams, the latter being secured in place by means of pivot bolts 14. Located adjacent the opposite sides of the traction frame are a pair of internal combustion motors, the cylinders of which are designated by the numerals 15 and 16. These cylinders are disposed on opposite sides of a transverse line extending through the traction frame and extend in opposite directions. The main drive shaft of the motor is designated by the numeral 17 and extends transversely of the traction frame and is arranged between the cylinders 15 and 16. This shaft is provided with the usual hangers and crank shafts, the latter being arranged in alinement with the cylinders and connected with the latter by means of the piston rods 18 and 19. The balance wheels are designated by the numerals 20 and 21 and are located on the opposite ends of the drive shaft 17. Since these parts are of well known construction a detailed description of the same need not be given.

The air pump cylinder is designated by the numeral 22 and is located adjacent the rear cylinder of the motor and extends parallel with the latter. This cylinder is provided with the usual piston and piston rod 23. Located adjacent the rear end of the traction frame is an air reservoir 24 and connection between the air pump cylinder 22 and reservoir 24 is established by means of a pipe section 25, the opposite ends of which are threaded into the reservoir and head end of the pump cylinder.

The in-take of the air pump cylinder is designated by the numeral 26 and is located directly opposite the connection 25. Both the in-take and connection 25 are provided with check valves which are arranged to work in opposite directions, that is to say, on the suction stroke of the pump piston the check in the in-take 26 will admit air to the cylinder and the check in the connection 25 will close so that when the piston moves in the opposite direction the check valve in the in-take will close and that in the connection 25 open to admit the air from the cylinder to the main reservoir 24.

The mechanism for actuating the air pump to supply air to the cylinder 24 and to automatically stop the pump after the air in the cylinder has reached a certain pressure will now be described:—Keyed or otherwise secured to the main drive shaft 17 and between the motor cylinders 15 and 16 is a friction disk 27 and loosely fitted on the main shaft 17 and adjacent the friction disk is a well known type of eccentric 28. That face of the eccentric 28 adjacent the friction disk 27 has bolted or otherwise secured thereto a friction disk 29. The latter is arranged eccentric with respect to the eccentric 28 but concentric with respect to the shaft 17 and is arranged to slide with the eccentric 28. The eccentric strap is designated by the numeral 30 and is arranged in alinement with the piston rod 23 of the pump cylinder to which it is connected at its rear side as shown at 31. The strap 30 is somewhat greater in width than the eccentric 28 and is so arranged on the latter as not to interfere with the sliding movement of the eccentric. It might here be stated, when the friction disks 27 and 29 are out of engagement the space between their opposed bearing surfaces will be considerably less than the width of the eccentric strap 30 so that when the eccentric slides and the disk 29 is brought into engagement with the disk 27 the eccentric will not be displaced from the strap 30. Arranged on that face of the eccentric 28 opposite to the face to which the friction disk 29 is secured is a pulley concentric with the shaft 17 similar to the disk 29. The pulley 31' is provided with a peripheral channel or groove in which is loosely fitted a collar 32 of greater diameter than the pulley 31'.

Rising from the floor of the traction frame and arranged on opposite sides of the shaft 17 are a pair of standards 33 and 34, the upper ends of which are in a plane with the shaft 17 and are provided with screw threaded openings for the reception of a pair of externally threaded pins 35 and 36. The standards are arranged adjacent the pulley 31' and the pins 35 and 36 extend parallel with the shaft 17 and have their terminals loosely fitted in oppositely arranged openings formed in that portion of the collar 32 lying beyond the pulley 31'. The outer ends of the pins 35 and 36 are provided with milled heads 37 and 38 by means of which the pins may be turned and threaded on to the pins and between the standards and collar 32 are jam nuts 39 and 40. Encircling the pins are a pair of helical compression springs 41 and 42, the opposite terminals of which bear on the faces of the nuts and collar 32. The function of these springs is to yieldingly hold the friction disk 29 in engagement with the friction disk 27 since it can be seen, owing to their dispositions, they will bear on the collar 32 and force the latter, eccentric 28 and friction disk 29 longitudinally of the shaft until the friction disk 29 bears on the friction disk 27. This will be the normal position of the parts and it can be readily seen, when the motors are in operation and movement imparted to the shaft 17 that by virtue of the eccentric the piston in the pump cylinder 22 will be reciprocated.

It is evident that so long as the friction disks 27 and 29 are in engagement that air will be forced into the reservoir 24 by the pump and in order that the pump may cease acting after the reservoir has been charged with a predetermined pressure the following construction is employed:—Arranged above and parallel with the shaft 17 is what will subsequently be termed a relief cylinder 45. This member is interiorly provided with a piston 46 having a piston or connecting rod 47, the extremity of which is fixedly secured to the upper side of the collar 32 and in a vertical plane with the shaft 17. In the normal position of the parts and when the friction disks 27 and 29 are in engagement the piston rod 47 will have moved outwardly until the piston 46 is adjacent one end of the relief cylinder. It will be seen that connection between the reservoir 24 and relief cylinder 45 is established by means of a pipe section 48, the opposite ends of which are threaded into the reservoir and that end of the relief cylinder adjacent the eccentric 28. As before stated, when the pump is in action the piston in the relief cylinder 45 will be at a point adjacent that end of the latter adjacent the eccentric 28 and connection 48. When the parts are so positioned the air will flow from the main reservoir into the relief cylinder and when a certain pressure in the main reservoir has been reached this pressure will be sufficient to move the piston 46 in the relief cylinder in a direction away from the eccentric. As the piston 46 moves its rod 47 will carry with it the collar 32 against the action of the springs 41 and 42. This movement of the collar will move the pulley, eccentric and friction disk 29 on the shaft 17, whereby the friction disk 29, will be moved from engagement with the friction disk 27, thus disconnecting the pump. If desired the springs 41 and 42 may be heavy enough to withstand any pressure on the relief piston 46 up to the required pressure it is desired to carry in the main reservoir; or a check valve or the like may be arranged in the connection 48 and constructed to admit air to the relief cylinder after a certain pressure has been reached in the main reservoir.

The compressor, reservoir, and control system above described, is illustrated in the present drawings as applied to a traction gang plow for elevating the individual plows thereof as is hereinafter more particularly described.

By referring now to the drawings it will be seen that the number of plows used in the gang is six. It must be understood however, that I am not to be limited to this specific number since it will be understood, from what will appear later, how a greater or less number of plows might be equally as well employed without departing from the spirit of the invention. As before stated, the plow beams are pivotally connected to the platform of the plow frame and are arranged beneath the platform, with their rear ends extending in advance of the rear end of the platform. Reference to Fig. 2 discloses the fact that these plows may be moved in a vertical plane by means of a plurality of chains 49 which are secured to clevises 50 fixedly secured to the rear end portions of the plow beams. A plurality of sheaves 51 are secured to the upper face and adjacent the rear end of the platform and correspond to the number of plow beams and are in alinement with the latter. Fixedly secured to the upper face of the platform and adjacent the front end thereof are a plurality of cylinders 52. These cylinders are in direct alinement with the sheaves 51 and are internally provided with pistons 53. The pistons 53 have the usual piston rods 54 which extend through the rear heads of the cylinders and terminate in eyes 55. It might here be stated, that the pistons 52 and their rods 54 lie in the same horizontal plane and are of considerably less length than the platform to which they are attached. As before stated, the chains 49 are secured at one end to these clevises 50 of the plow beams and are thence trained over the sheaves 51 and have their opposite ends secured to the eyed terminals of the piston rods 54.

By referring now to Fig. 1 it will be seen that the rear end portions of the cylinder 52 are each laterally provided with a nipple 56, the free end of which is directed forwardly and that extending rearwardly from the rear side of the main reservoir 24 are a plurality of nipples 57. The outer ends of the nipples 57 are provided with valve casings 58 in which are mounted two-way valves such as are shown in detail in Fig. 4. The valve casings 58 are provided with three openings, two of which are located at diametrically opposite points on the valve casings and the third intermediate of the said two openings. In securing the valve casings to the nipples 57 one of the oppositely arranged openings receives the nipple while the opposite opening receives a similar nipple 59. This will leave the intermediate openings open so as to constitute exhausts. The two-way valve employed has openings which correspond to openings in the valve casings so that when it is turned to one position communication will be established between the nipples 57 and 59 and when turned to another position communication will be established between the nipples 59 and the atmosphere and connection with the main reservoir cut off. The two-way valves are provided with elongated stems 60 which rise considerably above the reservoir and terminate in handles 61, which are within easy reach of the operator and serve as a means for opening and closing the valves. Connection is established between the nipples 59 and the nipples 56 of the cylinders to which the plow beams are connected by means of flexible tubes 51', the opposite ends of which are secured to the free ends of the nipples.

From the foregoing it can be seen that I have provided a device which is exceedingly simple in structure and comparatively inexpensive to manufacture, embodying few parts and these so arranged that the danger of derangement will be reduced to a minimum.

What is claimed as new, is:—

1. In a machine of the class described, the combination with a drive shaft having a friction disk keyed thereto, an eccentric loosely fitted on the drive shaft and having a friction disk bolted upon one face and concentric with the shaft, a pulley having a peripheral groove secured upon the other face of the eccentric and concentrically with respect to the shaft; a collar seated in said groove and extending beyond the same, and means connected with the collar and operable by air pressure to move the friction disks out of engagement with each other.

2. In a machine of the character described, the combination with a drive shaft, a friction disk keyed to said drive shaft, an eccentric loosely fitted on said shaft, of means for throwing said eccentric into and out of engagement with the friction disk, said means consisting of a grooved pulley secured to the eccentric, a collar mounted in the groove of the pulley, supporting standards, pins extending through said standards and adjustable therein, said pins being parallel to the drive shaft and connected to said collar, springs surrounding said pins and bearing against said collar to normally hold the eccentric in engagement with the friction disk, a cylinder positioned parallel to the drive shaft, a piston in said cylinder, and a piston rod for said piston having its free end connected with said collar, said piston being adapted to be operated by air pressure.

In testimony whereof, I affix my signature, in presence of two witnesses.

JOHN M. ANDERSON.

Witnesses:
H. C. BJONE,
A. M. BERG.